Patented July 29, 1924.

1,503,133

UNITED STATES PATENT OFFICE.

CHARLES F. RITCHIE, OF LOMPOC, CALIFORNIA, ASSIGNOR TO THE CELITE COMPANY, OF LOS ANGELES, CALIFORNIA, A CORPORATION OF DELAWARE.

PROCESS FOR THE PRODUCTION OF A FILTRATION ACCELERATOR.

No Drawing. Application filed March 26, 1923. Serial No. 627,713.

*To all whom it may concern:*

Be it known that I, CHARLES F. RITCHIE, a citizen of the United States, residing at Lompoc, in the county of Santa Barbara, State of California, have invented a new and useful Process for the Production of a Filtration Accelerator, of which the following is a specification.

This invention relates to the production of a filter-aid or filtration accelerator for use in the filtration of sugar liquor or other solutions, or of oils or for other purposes, and the main object of the invention is to provide a filter-aid or filtration accelerator through which certain commercial liquids may be filtered at a greater rate than through the filtration accelerators now in use.

In certain filtrations, particularly in the filtration of sugar in water in sugar refineries and in the filtration of various oils, the use of kieselguhr or diatomaceous earth is quite common as a filter-aid, such filter-aid being added to or mixed with the liquid to be filtered and serving partly to accelerate the filtration of the liquid through a filter press or other suitable filtering apparatus, and the main object of the present invention is to subject the kieselguhr or diatomaceous earth, which is to be used as a filter-aid, to a preparatory operation to increase its efficiency as a filter-aid.

It has been found that by subjecting the kieselguhr to a heating or calcining operation, for example at a temperature of about 1800° F. or above, the resulting product is in general more effective than the original uncalcined kieselguhr. It has also been found that in some cases the addition of sodium chloride or other inorganic salt or material to the kieselguhr before calcination, is advantageous in improving the effectiveness of the kieselguhr as a filter-aid.

I have found that a further large improvement in the filtration efficiency of the kieselguhr may be obtained by submitting the kieselguhr calcined, alone or calcined with sodium chloride, to a milling operation and second calcination, say at or about 1800° F. In case the kieselguhr has been calcined originally without the use of sodium chloride, then sodium chloride to the extent of about five per cent is preferably added before the second calcination. On the other hand, if the original calcination has been made with the use of the proper amount of sodium chloride, then the second calcination may be made either with or without the addition of fresh sodium chloride. In fact, I prefer to make the second calcination in some cases, without the use of a second portion of sodium chloride.

Strong ignition of kieselguhr alone produces a dehydration of the clay present as impurity, destroys organic matter which is present, and sets the clay. By setting, I mean destruction of the gelatinous nature of the clay and other changes which occur when clay is heated to about 1800° F. When the calcination is carried on in the presence of sodium chloride, sodium chloride first melts, is absorbed over the extensive surface of the kieselguhr and, finally partly vaporizes. Two chemical changes are known to occur, one producing sodium silicate and chlorine and the other sodium silicate and hydrochloric acid in accordance with the following reactions:

1. $SiO_2 + 2NaCl + O(air) = Na_2SiO_3 + Cl_2$.
2. $SiO_2 + 2NaCl + H_2O = Na_2SiO_3 + 2HCl$.

The formation of hydrochloric acid, according to the second equation has been proved by observation. The water required in equation No. 2 is available from the clay which occurs as an impurity to the extent of five to fifteen per cent in ordinary kieselguhr, from the moisture which is present to the extent of about seven per cent in certain commercial brands of kieselguhr used by me, or from the air, or combustion of the fuel used in the calcination.

The production of chlorine in accordance with equation number 1 has been noted in certain cases in sufficient quantity to turn blue a filter paper which had been dipped in a mixture of starch paste and potassium iodide.

The above changes are then known to occur under certain conditions. Other changes also probably occur, such as the simple fluxing action of the fused or vaporized sodium chloride. Such fluxing action would affect the clay and the finest particles of silica in the kieselguhr before affecting the larger particles, (compare Bancroft: Applied Colloid Chemistry, page 152). The sintering of the clay and the fines would decrease the resistance which these objectionable fines present to flow of liquid through the filtration accelerator.

In carrying out the calcination of kieselguhr with added sodium chloride, there is considerable bonding action, due to clay or other ingredients present. The product coming, say from a rotary calciner, is composed to a large extent of lumps of various sizes. Some are six inches in diameter, many two or three inches in diameter, and a great many more have about the size of a pea. When it is considered that a good grade of kieselguhr contains diatoms which average about .001 inch in the longest dimension, it is obvious that these little balls, even of the finest sizes mentioned, contain thousands of diatoms more or less bonded together. It is also conceivable that the center of such a cluster would not be subjected to the same action as the outside of the ball. If, for example, steam or oxygen, or even direct exposure of the diatomite to the direct heat of the burner is necessary, then the diatomite protected by the encrusting material around it, would not be properly acted upon.

With this in mind, I have submitted material calcined once to a milling operation to break down these lumps and balls and then to a second calcination. The bonding action of the clay or other materials in the kieselguhr having been destroyed by the first calcination, there is less bonding during the second calcination. Although the bonding action is not entirely absent in the second calcination, there are at least fresh surfaces of kieselguhr exposed to whatever agent it is which accomplished the desired purpose, to the water vapor, to the oxygen of the air, or to the source of heat, or to other gases liberated during heating. Also, the sodium silicate formed in the first calcination may be redistributed in such manner that in the second calcination it cements together individual diatoms, say end to end, to give a more spongy or porous product.

I prefer to add sodium chloride to the kieselguhr before the first calcination. In case sodium chloride has been used in the first calcination, it is not usually necessary to add a fresh portion before the second ignition. With very impure kieselguhrs, however, such as those of high iron content, it may be desirable to add a second portion of sodium chloride in order to increase the whiteness of the burned product. With an ordinary cream colored kieselguhr, such as the usual commercial article, one burning with five per cent sodium chloride at the stated temperature suffices to change the cream color to an almost snow white. If ordinary kieselguhr is calcined alone at 1800° F. the color changes from light cream to pink or brick red, depending on the amount of iron present. If this pink to red product is then admixed with sodium chloride, and again calcined at 1800° F., the color changes to white.

As raw material for my process, I have used, for example, a product produced by calcining kieselguhr with five per cent of admixed sodium chloride (commercial salt) at a temperature of 1800° F. for one hour. The original kieselguhr contained seven per cent moisture, and was so milled that approximately ninety-five per cent would pass two hundred mesh. The calcination was produced in a muffle furnace. The product from this first calcination, my so-called raw material, was milled through a Williams swing hammer mill and then recharged without further treatment, into the same muffle as before. Heat was again applied, and a pyrometer in the center of a charge in the muffle showed a temperature of approximately 1800° F.

In testing the product I proceed as follows: Sixty pounds raw cane sugar is dissolved in forty pounds water at 80° C. To this there is added 0.48 pounds of the kieselguhr. On pumping through a filter press with a filter area of 0.37 square feet, I obtained in twelve minutes the following amounts of filtrate: with original kieselguhr, 6.4 pounds; with once calcined kieselguhr, 35.0 pounds; with twice calcined kieselguhr, 51.5 pounds.

By the term kieselguhr, as used throughout this application I mean kieselguhr, diatomaceous earth, infusorial earth, fossil flour, diatomite, or other porous inorganic matter which is used as an accelerator of commercial filtrations.

Although the example given above specifies a sixty per cent solution of sugar as the liquor being filtered, increased efficiencies have been noted also with various oils and also with miscellaneous aqueous solutions. This process is not restricted to the use of the product to any particular industry, in fact the doubly calcined product has such bulk and lightness, that it may be used to advantage in heat insulation where lightness and porosity are important factors.

I have described the use of sodium chloride in this process, and this is the agent I prefer to use. On the other hand, I may use in place of sodium chloride, any of the following materials, either alone or in the form of mixtures with other inorganic substances: lime, ground feldspar, borax, sodium carbonate, sodium bi-carbonate, calcium chloride, and other salts of the alkali or alkaline earth metals, all of these materials being capable of fluxing reaction with the kieselguhr and acting in varying degrees in increasing the filtering efficiency of the product. Eutectic mixtures have been used by me in order to obtain fluxing action at lower temperatures than with either pure salt alone.

In carrying out the process I may use instead of a muffle furnace, any other suitable type of furnace or roaster. A rotary kiln or calciner heated internally, for example, is suitable. I do not mean to limit myself to any particular mechanical method of carrying out my process.

I may add the sodium chloride previous to the first calcination, or just before the second calcination. In some cases I may add sodium chloride just before both of the calcinations. The sodium chloride is more completely discharged if it is added before only one of the calcinations, there being little difference on this score, whether the sodium chloride is added before the first or before the second burning.

In both the first and second burnings I have used temperatures ranging from 600° F. up to 2000° F. I find temperatures of approximately 1800° F. in both the first and the second burnings to be preferable for certain kieselguhrs. If the temperature be too low, the amount of reaction is not sufficient. If the temperature be much above 2000° F., an undesired amount of sintering occurs, and the product is sandy and inclined to settle rapidly when added to various liquids. The time of burning has been varied from fifteen minutes to twelve hours, but in general about one hour gives the best results.

The importance of milling just previous to the second calcination varies with the severity of the first calcination. A hard burned product reburned without milling shows only a slight improvement. A soft burned material on the other hand, is so much broken up in ordinary handling and recharging to the furnace that milling is not so essential, but even with temperatures of first calcination as low as 1600° F., I find that milling before the second calcination makes a substantial improvement. I may choose for the milling, any suitable and convenient type of mill, preference being had for a disintegration rather than for an actual grinding, which might destroy the porous structure of the diatom skeleton.

I do not limit myself to a second calcination only, but would repeat the calcinations for any given quality of the kieselguhr, as many times as the improvement in the quality of the resulting filter-aid justifies the expense of the recalcination.

Besides the changes which have been given above as possible explanations of the improvement in filtration efficiency of the accelerator, due to a second calcination, there is also the possibility of a transformation in the form of the silica. It is well known that either amorphous silica, or silica in the form of quartz, is transformed at high temperatures into the less dense forms of cristobalite or tridymite, and that this change is accelerated and made possible at lower temperatures than otherwise possible, by the presence of such compounds as sodium chloride. My process makes use of all such transformations of silica which are useful in decreasing the resistance of the kieselguhr to flow of liquids through it.

While I prefer to add an inorganic substance, such as sodium chloride, to the kieselguhr, before or during at least one of the calcinations above referred to, my process may also be carried out by repeated calcinations of kieselguhr about or above 1800° F., without the addition of such inorganic substance, thereby effecting such of the transformations and changes above referred to as do not depend on the presence of such added substance.

What I claim is:

1. The process of producing a filter-aid which consists in subjecting kieselguhr to repeated calcinations, before using the same as a filter-aid.

2. The process which consists in calcining, in the presence of an added inorganic salt capable of a fluxing reaction therewith, kieselguhr which has been already once calcined.

3. The process which consists in repeatedly calcining kieselguhr which has been previously calcined in the presence of an added inorganic salt capable of a fluxing reaction therewith.

4. The process which consists in subjecting kieselguhr to repeated calcination, in the presence of an added inorganic salt capable of a fluxing reaction therewith.

5. The process which consists in calcining, in the presence of an added inorganic salt capable of a fluxing reaction therewith, kieselguhr which has been already once calcined and subsequently milled.

6. The process which consists in repeatedly calcining kieselguhr which has been previously calcined in the presence of an added inorganic salt capable of a fluxing reaction therewith and subsequently milled.

7. The process which consists in subjecting kieselguhr to repeated calcination, in the presence of an added inorganic salt capable of a fluxing reaction therewith, the kieselguhr being milled after each calcination.

8. The process which consists in repeated calcination, in the presence of an added inorganic salt capable of fluxing reaction therewith, of kieselguhr which has been previously calcined in the presence of an added inorganic salt of the same nature.

9. The process which consists in calcining, in the presence of a salt of an alkali metal capable of a fluxing action therewith, kieselguhr which hase been already once calcined.

10. The process which consists in repeatedly calcining kieselguhr which has been previously calcined in the presence of a salt of an alkali metal capable of a fluxing action therewith, the kieselguhr being milled after each calcination.

11. The process which consists in subjecting kieselguhr to repeated calcination, in the presence of a salt of an alkali metal capable of a fluxing action therewith.

12. The process which consists in calcining, in the presence of a salt of an alkali metal capable of a fluxing action therewith, kieselguhr which has been already once calcined and subsequently milled.

13. The process which consists in repeatedly calcining kieselguhr which has been previously calcined in the presence of a salt of an alkali metal capable of a fluxing action therewith, and subsequently milled.

14. The process which consists in repeated calcination, in the presence of a salt of an alkali metal capable of a fluxing action therewith, of kieselguhr which has been previously calcined in the presence of a salt of an alkali metal, and subsequently milled.

15. The process which consists in calcining, in the presence of sodium chloride, kieselguhr which has been already once calcined.

16. The process which consists in repeatedly calcining kieselguhr which has been previously calcined in the presence of sodium chloride.

17. The process which consists in subjecting kieselguhr to repeated calcination, in the presence of sodium chloride.

18. The process which consists in calcining, in the presence of sodium chloride, kieselguhr which has been already once calcined and subsequently milled.

19. The process which consists in repeatedly calcining kieselguhr which has been previously calcined in the presence of sodium chloride and subsequently milled.

20. The process which consists in repeated calcination, in the presence of sodium chloride, of kieselguhr which has been previously calcined in the presence of sodium chloride.

21. The process which consists in calcining at temperatures above 1600° F., in the presence of a salt of an alkali metal capable of a fluxing action therewith, kieselguhr which has been already once calcined.

22. The process which consists in repeatedly calcining, at temperatures above 1600° F., kieselguhr which has been previously calcined in the presence of a salt of an alkali metal capable of a fluxing action therewith.

23. The process which consists in subjecting kieselguhr to repeated calcination, at temperatures above 1600° F., in the presence of a salt of an alkali metal capable of a fluxing action therewith.

24. The process which consists in calcining at temperatures above 1600° F., in the presence of a salt of an alkali metal capable of a fluxing action therewith, kieselguhr which has been already once calcined and subsequently milled.

25. The process which consists in repeatedly calcining, at temperatures above 1600° F., kieselguhr which has been previously calcined in the presence of a salt of an alkali metal capable of a fluxing action therewith, and subsequently milled.

26. The process which consists in repeated calcination at temperatures above 1600° F., in the presence of a salt of an alkali metal, of kieselguhr which has been previously calcined in the presence of a salt of an alkali metal capable of a fluxing action therewith, the kieselguhr being milled after each calcination.

27. The process which consists in calcining at temperatures above 1600° F., in the presence of about five per cent sodium chloride, kieselguhr which has been already once calcined.

28. The process which consists in repeatedly calcining, at temperatures above 1600° F., kieselguhr which has been previously calcined in the presence of about five per cent of sodium chloride.

29. The process which consists in subjecting kieselguhr to repeated calcination, at temperatures above 1600° F., in the presence of about five per cent of sodium chloride.

30. The process which consists in calcining at temperatures above 1600° F., in the presence of about five per cent of sodium chloride, kieselguhr which has been already once calcined and subsequently milled.

31. The process which consists in repeatedly calcining, at temperatures above 1600° F., kieselguhr which has been previously calcined in the presence of about five per cent of sodium chloride and subsequently milled.

32. The process which consists in repeated calcination at temperatures above 1600° F., in the presence of about five per cent of sodium chloride, of kieselguhr which has been previously calcined in the presence of about five per cent of sodium chloride, the kieselguhr being milled after each calcination.

33. A new article of commerce produced by at least two successive calcinations of kieselguhr, at temperatures of approximately 1800° F., the material being milled before each calcination and mixed with five per cent of sodium chloride previous to the first calcination.

34. A new article of commerce produced by calcining in the presence of an inorganic salt capable of fluxing reaction with kieselguhr, kieselguhr which has been previously calcined.

35. A new article of commerce produced by subjecting kieselguhr to repeated calcination in the presence of inorganic salts capable of fluxing reaction therewith.

36. A new article of commerce produced by subjecting kieselguhr to repeated calcinations, an inorganic salt capable of fluxing reaction with the kieselguhr being added thereto previous to at least one of said calcinations.

37. As an article of manufacture a filter-aid consisting of kieselguhr which has been repeatedly calcined before use as a filter-aid.

38. As an article of manufacture kieselguhr which has been subjected to repeated calcination in the presence of sodium chloride.

39. As an article of manufacture kieselguhr which has been calcined in the presence of a salt of an alkali metal and subsequently disintegrated and recalcined at a temperature above 1600° F.

40. As an article of manufacture kieselguhr which has been previously calcined in the presence of sodium chloride and subsequently disintegrated and then recalcined at a temperature above 1600° F.

41. A new article of commerce produced by at least two successive calcinations of kieselguhr, at temperatures above 1600° F., the material being mixed with about five per cent of sodium chloride previous to the first calcination, and disintegrated before each calcination.

In testimony whereof I have hereunto subscribed my name this 13th day of March, 1923.

CHARLES F. RITCHIE.